US011618003B2

(12) United States Patent
Katikaneni et al.

(10) Patent No.: US 11,618,003 B2
(45) Date of Patent: Apr. 4, 2023

(54) DIESEL REFORMING APPARATUS HAVING A HEAT EXCHANGER FOR HIGHER EFFICIENCY STEAM REFORMING FOR SOLID OXIDE FUEL CELLS (SOFC)

(71) Applicants: Saudi Arabian Oil Company, Dhahran (SA); Korea Advanced Institute of Science and Technology, Daejeon (KR)

(72) Inventors: Sai P. Katikaneni, Dhahran (SA); Joongmyeon Bae, Daejeon (KR); Jiwoo Oh, Daejeon (KR); Minseok Bae, Daejeon (KR); Dongyeon Kim, Daejeon (KR)

(*) Notice: Subject to any disclaimer, the term of this patent is extended or adjusted under 35 U.S.C. 154(b) by 296 days.

(21) Appl. No.: 16/908,977

(22) Filed: Jun. 23, 2020

(65) Prior Publication Data

US 2021/0394151 A1   Dec. 23, 2021

(51) Int. Cl.
 *B01J 19/24*   (2006.01)
 *B01J 19/00*   (2006.01)
 (Continued)

(52) U.S. Cl.
 CPC ......... *B01J 19/245* (2013.01); *B01J 19/0013* (2013.01); *B01J 23/06* (2013.01); *B01J 23/38* (2013.01); *C01B 3/382* (2013.01); *C01B 3/40* (2013.01); *C01B 3/58* (2013.01); *C10G 63/02* (2013.01); *H01M 8/0618* (2013.01); *H01M 8/0675* (2013.01); *H01M 8/1246* (2013.01); *B01J 2219/00087* (2013.01); *C01B 2203/0244* (2013.01); *C01B 2203/045* (2013.01);
 (Continued)

(58) Field of Classification Search
 CPC .. C01B 3/382; C01B 3/40; C01B 3/58; C01B 2203/0244; C01B 2203/045; C01B 2203/0485; C01B 2203/063; C01B 2203/0883; C10G 2300/1055; C10G 2300/202
 See application file for complete search history.

(56) References Cited

U.S. PATENT DOCUMENTS 2,642,381 A   6/1953   Dickinson
6,156,084 A   12/2000  Bonville, Jr. et al.
(Continued)

FOREIGN PATENT DOCUMENTS

EP   112613 B1    3/1991
EP   2767506 A1   8/2014
(Continued)

OTHER PUBLICATIONS

U.S. Notice of Allowance and Fee(s) Due dated Sep. 20, 2021 pertaining to U.S. Appl. No. 16/830,649, filed Mar. 26, 2020, 9 pages.
(Continued)

*Primary Examiner* — Matthew J Merkling
(74) *Attorney, Agent, or Firm* — Dinsmore & Shohl LLP

(57) ABSTRACT

Embodiments of the present disclosure are directed to a diesel reformer system comprising: a diesel autothermal reforming unit; a post-reforming unit disposed downstream of the autothermal reforming unit; a heat exchanger disposed downstream of the post-reforming unit; and a desulfurization unit disposed downstream of the heat exchanger.

12 Claims, 1 Drawing Sheet

(51) Int. Cl.
*B01J 23/06* (2006.01)
*B01J 23/38* (2006.01)
*C01B 3/38* (2006.01)
*C01B 3/40* (2006.01)
*C01B 3/58* (2006.01)
*C10G 63/02* (2006.01)
*H01M 8/0612* (2016.01)
*H01M 8/0662* (2016.01)
*H01M 8/1246* (2016.01)
*H01M 8/12* (2016.01)

(52) U.S. Cl.
CPC ...... *C01B 2203/0485* (2013.01); *C01B 2203/063* (2013.01); *C01B 2203/0883* (2013.01); *C10G 2300/1055* (2013.01); *C10G 2300/202* (2013.01); *H01M 2008/1293* (2013.01); *H01M 2300/0074* (2013.01)

(56) References Cited

U.S. PATENT DOCUMENTS

| | | |
|---|---|---|
| 6,521,204 B1 | 2/2003 | Borup et al. |
| 6,635,372 B2 | 10/2003 | Gittleman |
| 6,994,930 B1 | 2/2006 | Geisbrecht et al. |
| 7,323,159 B2 | 1/2008 | Ahluwalia et al. |
| 8,557,189 B2 | 10/2013 | Roychoudhury et al. |
| 8,563,184 B2 | 10/2013 | Kaupert et al. |
| 9,199,846 B2 | 12/2015 | Roychoudhury et al. |
| 9,337,505 B2 | 5/2016 | Roychoudhury et al. |
| 2002/0007595 A1 | 1/2002 | Maier-Roeltgen et al. |
| 2004/0194383 A1 | 10/2004 | Wheat et al. |
| 2009/0165368 A1 | 7/2009 | Liu et al. |
| 2009/0186246 A1 | 7/2009 | Heo et al. |
| 2009/0223861 A1 | 9/2009 | Sugiura et al. |
| 2010/0104897 A1* | 4/2010 | Bae ............ C01B 3/26 429/425 |
| 2010/0104899 A1* | 4/2010 | Bae ............ H01M 8/0675 429/425 |
| 2012/0021307 A1 | 1/2012 | Watanabe et al. |
| 2016/0293984 A1 | 10/2016 | Kang et al. |
| 2017/0214072 A1* | 7/2017 | Fischer ........... H01M 8/04302 |
| 2018/0358639 A1 | 12/2018 | Tajima et al. |
| 2019/0148744 A1 | 5/2019 | Choi et al. |

FOREIGN PATENT DOCUMENTS

| | | | |
|---|---|---|---|
| EP | 1645540 B1 | 6/2017 | |
| JP | 2003081607 A * | 3/2003 | ............ B01J 23/42 |
| JP | 2004031025 A | 1/2004 | |
| JP | 2005255896 A | 9/2005 | |
| JP | 2006278074 A | 10/2006 | |
| JP | 2006351293 A | 12/2006 | |
| JP | 4885917 B2 | 6/2010 | |
| JP | 6182450 B2 | 8/2017 | |
| KR | 100718106 B1 | 5/2007 | |
| KR | 20090079517 A | 7/2009 | |
| KR | 101077929 B1 | 10/2011 | |
| KR | 101172841 B1 | 8/2012 | |
| KR | 101179539 B1 | 8/2012 | |
| KR | 101179539 B1 * | 9/2012 | |
| KR | 101276677 B1 | 6/2013 | |
| WO | 2009057648 A1 | 5/2009 | |
| WO | 2016114214 A1 | 7/2016 | |

OTHER PUBLICATIONS

International Search Report and Written Opinion dated Feb. 22, 2021 pertaining to International application No. PCT/US2020/060096 filed Nov. 12, 2020, 15 pgs.

Araki S. et al. "Start-up procedures in autothermal reforming of biogas over a Ni based catalytic monolith", Catalysis Communications, Elsevier, Amsterdam, NL, vol. 10, No. 9, Apr. 25, 2009, pp. 1300-1304.

Springmann S. et al. "Cold start simulations of a gasoline based fuel processor for mobile fuel cell applications", Journal of Power Sources, Elsevier SA, CH, vol. 128, No. 1, Mar. 29, 2004, pp. 13-24.

U.S. Office Action dated Mar. 24, 2022 pertaining to U.S. Appl. No. 16/907,731, filed Jun. 22, 2020, 39 pages.

Zhang, Dongke "Homogeneous Combustion Catalysts for Efficiency Improvements and Emission Reduction in Diesel Engines" In: 7th Asia-Pacific Conference on Combustion, National Taiwan University, Taipei, Taiwan May 24-27, 2009 (Year: 2009).

International Search Report and Written Opinion dated Mar. 19, 2021 pertaining to International application No. PCT/US2020/064833 filed Dec. 14, 2020, 14 pgs.

Office Action dated May 27, 2021 pertaining to U.S. Appl. No. 16/830,649, filed Mar. 26, 2020, 22 pages.

International Search Report and Written Opinion dated Oct. 4, 2021 pertaining to International application No. PCT/US2021/038440 filed Jun. 22, 2021, 13 pages.

Yoon, S. et al. "Development of a self-sustaining kWe-class integrated diesel fuel processing system for solid oxide fuel cells", International Journal of Hydrogen Energy, Elsevier Science Publishers B.V., Barking, GB, vol. 36, No. 16, Oct. 1, 2010, pp. 10302-10310.

* cited by examiner

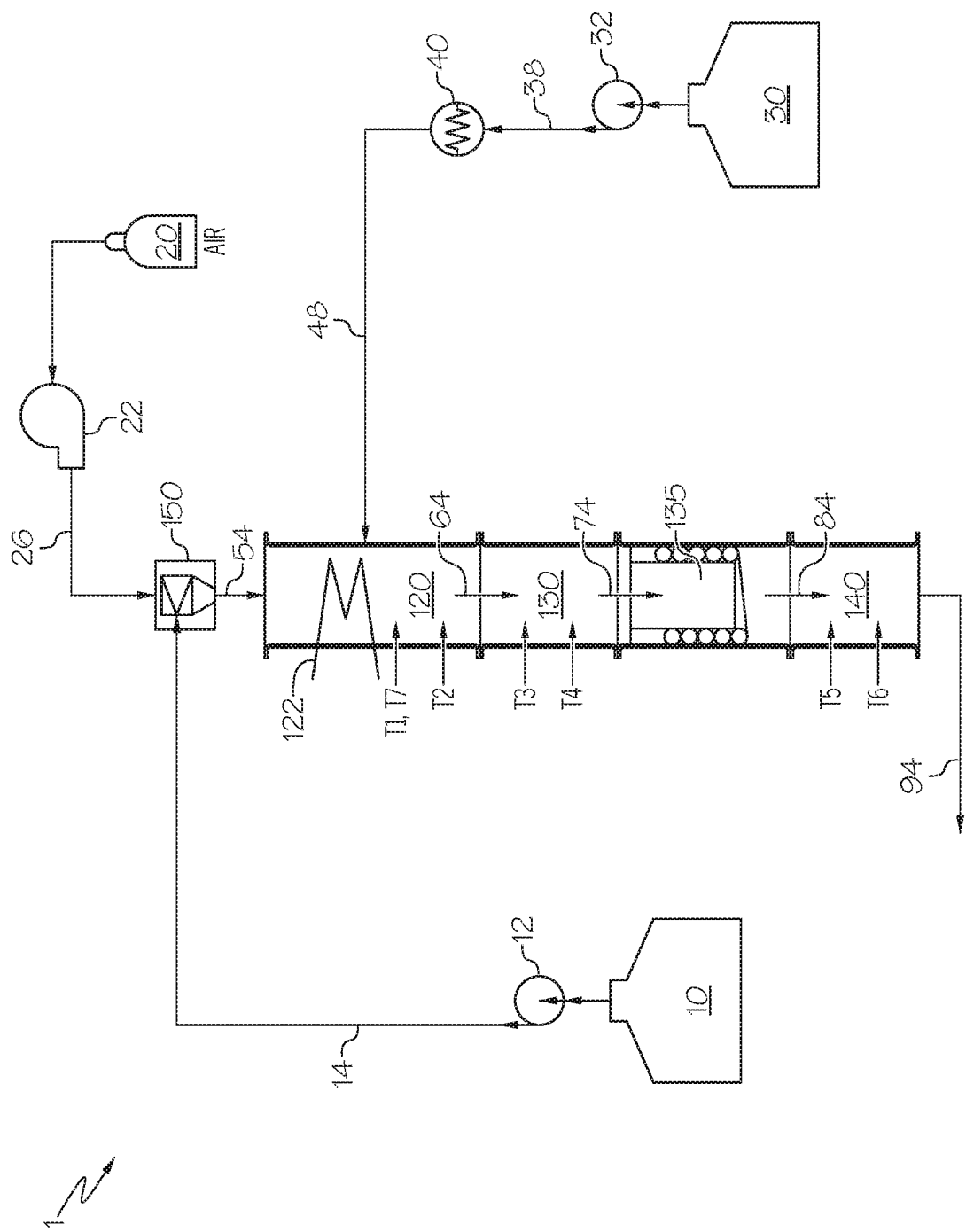

DIESEL REFORMING APPARATUS HAVING A HEAT EXCHANGER FOR HIGHER EFFICIENCY STEAM REFORMING FOR SOLID OXIDE FUEL CELLS (SOFC)

TECHNICAL FIELD

Embodiments of the present disclosure generally relate to diesel reforming systems and specifically relate to diesel reforming systems having improved efficiency for coupling with Solid Oxide Fuel Cells (SOFC).

BACKGROUND

Fuel cells are power generation systems that convert the chemical reaction energy of hydrogen and oxidant contained in hydrocarbon-based materials such as hydrogen, methanol, and ethanol into direct electrical energy.

Since a fuel cell uses hydrogen as a fuel, the hydrogen for the fuel cell can be obtained through steam reforming from a hydrocarbon-based fuel such as methane, methanol, natural gas, gasoline and diesel. Such a fuel reformer can be classified into steam reforming, partial oxidation reforming and autothermal reforming according to a reforming method.

Steam reformers are suitable for fuels with a high hydrogen content in the reformed gas and short carbon chains such as methane and natural gas. In addition, the steam reforming reaction is suitable for an SOFC system having a high operating temperature because the reformed gas contains a high temperature. However, the steam reformer consumes a large amount of heat to generate steam. There is a problem that the structure for heat recovery is complicated due to the heat consumption due to the endothermic reaction and that the manufacturing difficulty and the manufacturing cost of the reactor are increased due to these reasons.

SUMMARY

Accordingly, there is a continual need for diesel reformers using diesel fuel, which yields improved system efficiency.

Embodiments of the present disclosure meet this need by efficiently controlling the arrangement conditions of the apparatus with constrained heat exchanger setup. The present diesel reformer embodiments provides efficient production of hydrogen by reforming diesel fuel supplied with a diesel autothermal reforming unit, a post-reforming unit disposed downstream of the autothermal reforming unit, a heat exchanger disposed downstream of the post-reforming unit, and a desulfurization unit. Without being bound by theory, this sequential arrangement of system components in conjunction with temperature control and feed control maximizes reforming efficiency, which is highly desirable when coupling the diesel reformer to an SOK system.

According to one embodiment of the present disclosure, a diesel reformer system comprising a diesel autothermal reforming unit; a post-reforming unit disposed downstream of the autothermal reforming unit; a heat exchanger disposed downstream of the post-reforming unit; and a desulfurization unit disposed downstream of the heat exchanger.

According to another embodiment, a method of diesel reforming is provided. The method comprises: introducing one or more feed streams to a diesel autothermal reforming unit to at least partially convert the one or more feed streams to a diesel reformate, wherein the one or more feed streams comprising diesel fuel, air, and steam. The one or more feed streams comprise: a Steam to Carbon Ratio (SCR) greater than 1, wherein SCR=Steam feed/total Carbon in diesel fuel feed, and an Oxygen to Carbon Ratio (OCR) less than 1, wherein OCR=$O_2$ input from air feed/total Carbon in diesel fuel feed. The method also includes introducing the diesel reformate to a post-reforming unit disposed downstream of the diesel autothermal reforming unit, wherein the post-reforming unit selectively decomposes low carbon ($C_2$-$C_5$) hydrocarbons in the diesel reformate into hydrogen and methane. Moreover, the method includes passing post-reforming unit diesel reformate through a heat exchanger disposed downstream of the post-reforming unit and into a desulfurization unit disposed downstream of the heat exchanger, wherein the desulfurization unit removes sulfur compounds from the post-reforming unit diesel reformate.

Additional features and advantages of the described embodiments will be set forth in the detailed description which follows, and in part will be readily apparent to those skilled in the art from that description or recognized by practicing the described embodiments, including the detailed description which follows and the claims.

BRIEF DESCRIPTION OF THE DRAWINGS

The following detailed description of specific embodiments of the present disclosure can be best understood when read in conjunction with the following drawing in which:

FIG. 1 is a schematic illustration of a diesel reforming system according to one or more embodiments of the present disclosure.

Reference will now be made in detail to various embodiments, some embodiments of which are illustrated in the accompanying drawings.

DETAILED DESCRIPTION

Embodiments of the present disclosure are directed to a diesel reformer system and a method of diesel reforming. Referring to FIG. 1, a diesel reformer system 1 is provided. The diesel reformer system 1 comprises a diesel autothermal reforming unit 120, a post-reforming unit 130 disposed downstream of the autothermal reforming unit 120, a heat exchanger 135 disposed downstream of the post-reforming unit 130, and a desulfurization unit 140 disposed downstream of the heat exchanger 135. In one embodiment as depicted in FIG. 1, the diesel autothermal reforming unit 120, the post-reforming unit 130, the heat exchanger 135, and the desulfurization unit 140 are incorporated into a single reactor unit.

In operation, the diesel reforming system 1 may conduct the following diesel reforming method as shown in FIG. 1. As shown in FIG. 1, the method may include introducing one or more feed streams to a diesel autothermal reforming unit 120 to at least partially convert the one or more feed streams to a diesel reformate 64. The feed streams may comprise diesel fuel 14, air 26, and steam 48. The diesel fuel 14 feed may be pumped from a diesel tank 10 by a pump 12.

The temperature of the feed streams may be from 10° C. to 50° C., or from 20° C. to 50° C., or from 20° C. to 40° C., or about 25° C. The pressure of the feed streams may be from 0.5 atm to 2 atm, or from 0.5 atm to 1.5 atm, or about 1 atm. In some embodiments, the diesel fuel at the diesel tank 10 may be stored at room condition, about 25° C. and about 1 atm.

Similarly, the air 26 feed may be delivered from an air tank 20 by blower 22. As shown in FIG. 1, the diesel fuel 14 and air 26 feeds may be mixed upstream of the diesel autothermal reformer unit 120 at a mixing station 150. The mixing station 150 may include a flow nozzle, which is utilized to pass the mixture 54 of diesel fuel and air to the reactor unit. In the embodiment of FIG. 1, the mixture 54 of diesel fuel and air may be fed upstream of a preheater 122.

The preheater 122 may be disposed at the top of the diesel autothermal reformer unit 120. In some embodiments, the preheater 122 may be a heating coil. The preheater 122, which may be used during the initial heat-up of the reforming catalyst with the air feed 26, may heat the reforming catalyst in the diesel autothermal reformer unit 120 to a temperature of up to 300° C., or from 200° C. to 300° C., or from 250° C. to 300° C. The preheater 122 may heat the air feed 26 to a temperature of up to 450° C., or from 350° C. to 450° C., or from 400° C. to 450° C. In some embodiments, the preheater 122 will not heat the mixture 54 of diesel fuel and air. The diesel fuel 14 will not be supplied during the heating of the reforming catalyst.

For the steam feed 48, it is contemplated that water is pumped from water tank 30 via pump 32 and is then converted into steam by heat exchanger 40. As shown in the embodiment of FIG. 1, the steam feed 48 is delivered downstream of preheater 122. The steam feed 48 may be heated up to 150° C. In further embodiments, the heat exchanger 40 may heat the steam feed 48 from 100° C. to 150° C., or from 110° C. to 150° C., or from 120° C. to 150° C.

Various feed amounts are contemplated for the diesel reforming system 1 of FIG. 1. In one embodiment, the diesel reforming system 1 may have a Steam to Carbon Ratio (SCR) greater than 1, wherein SCR=Steam feed/total Carbon in diesel fuel feed. Furthermore, the diesel reforming system 1 may have an Oxygen to Carbon Ratio (OCR) less than 1, wherein OCR=$O_2$ input from air feed/total Carbon in diesel fuel feed. In further embodiments, the SCR is from 1.5 to 4, or from 2 to 3. In further embodiments, the OCR is from 0.5 to 0.9, or from 0.6 to 0.8. Without being bound by theory, the present diesel reforming system 1 in combination with these OCR and SCR ranges have been surprisingly found to yield improved system efficiency.

The diesel autothermal reforming unit 120 utilizes high pressure and high temperature operating conditions. For example, the diesel autothermal reforming unit 120 may have an operating temperature of at least 700° C., or from 750 to 1100° C., or from 750 to 850° C. Moreover, the diesel autothermal reforming unit 120 may have an operating pressure of at least 0.5 bar, or from 0.5 to 1.5 bars, or from 1.0 to 1.5 bars, or about 1 bar at atmospheric condition.

The diesel reformate 64 comprises various components, including syngas (i.e., hydrogen and carbon monoxide). The steam reforming reaction conducted by the diesel autothermal reforming unit 120 is as follows:

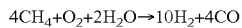

$$4CH_4+O_2+2H_2O \rightarrow 10H_2+4CO$$

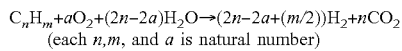

$$C_nH_m+aO_2+(2n-2a)H_2O \rightarrow (2n-2a+(m/2))H_2+nCO_2$$
(each $n, m,$ and $a$ is natural number)

The conversion of the methane to syngas in the diesel autothermal reforming unit 120 may be from 95% to 100%, or from 96% to 100%, or from 97% to 100% or from 98% to 100%, or from 99% to 100%, or from 99.5% to 100%, or from 99.9% to 100%, or about 100%.

Referring again to FIG. 1, the diesel reformate 64 is introduced to a post-reforming unit 130 disposed downstream of the diesel autothermal reforming unit 120. Here, the post-reforming unit 130 selectively decomposes low carbon ($C_2$-$C_5$) hydrocarbons in the diesel reformate 64 into a post-reforming unit diesel reformate stream 74 comprising hydrogen and methane. In detail, by the post-reforming catalyst, the low carbon hydrocarbon material ($C_2$-$C_5$) in the diesel reformate 64 is reacted with hydrogen and vapor contained in the diesel reformate 64 to be selectively decomposed into hydrogen and methane.

The inlet of the post-reforming unit 130 utilizes high temperature and high pressure operating conditions. For example, the inlet of the post-reforming unit 130 may have an operating temperature range of from 650° C. to 850° C., or from 650° C. to 800° C., or from 700° C. to 850° C., or from 700° C. to 800° C., or about 750° C. Moreover, the inlet of the post-reforming unit 130 may have an operating pressure of at least 0.5 bar, or from 0.5 to 1.5 bars, or from 1.0 to 1.5 bars, or about 1 bar at atmospheric condition.

The outlet of the post-reforming unit 130 utilizes high temperature and high pressure operating conditions. For example, the outlet of the post-reforming unit 130 may have an operating temperature range of from 450° C. to 800° C., or from 450° C. to 750° C., or from 450° C. to 700° C., or from 450° C. to 650° C., or from 450° C. to 600° C., or from 500° C. to 800° C., or from 500° C. to 750° C., or from 500° C. to 700° C., or from 500° C. to 650° C., or from 500° C. to 600° C., or from 550° C. to 800° C., or from 550° C. to 750° C., or from 550° C. to 700° C., or from 550° C. to 650° C., or from 550° C. to 600° C. Moreover, the outlet of the post-reformer 120 may have an operating pressure of at least 0.5 bar, or from 0.5 to 1.5 bars, or from 1.0 to 1.5 bars, or about 1 bar at atmospheric condition.

Next, the post-reforming unit diesel reformate 74 is passed through a heat exchanger 135 disposed downstream of the post-reforming unit 130. Without being bound by theory, the heat transfer amount of the heat exchanger 135 is optimized to make higher system efficiency by controlling the heat transfer amount (UA). The heat transfer amount (UA) is equal to (U), the heat transfer coefficient multiplied by (A) the heat transfer surface area. The heat transfer amount (UA) may be from 0.75 watts per kelvin (W/K) to 4.0 W/K, from 0.75 W/K to 3.5 W/K, from 0.75 W/K to 3.0 W/K, from 0.8 W/K to 4.0 W/K, from 0.8 W/K to 3.5 W/K, from 0.8 W/K to 3.0 W/K, 1.0 W/K to 4.0 W/K, from 1.0 W/K to 3.5 W/K, from 1.0 W/K to 3.0 W/K, from 0.75 W/K to 1.50 W/K, or from 0.80 W/K to 1.50 W/K, from 0.90 W/K to 1.50 W/K, from 1.00 W/K to 1.50 W/K, from 0.75 W/K to 1.40 W/K, from 0.80 W/K to 1.40 W/K, from 0.90 W/K to 1.40 W/K, from 1.00 W/K to 1.40 W/K, from 0.75 W/K to 1.30 W/K, from 0.80 W/K to 1.30 W/K, from 0.90 W/K to 1.30 W/K, from 1.00 W/K to 1.30 W/K, or about 1.25 W/K. In some embodiments, the heat transfer coefficient (U) may be from 6.0 to 8.5, from 6.5 to 8.5, from 7.0 to 8.5, from 7.5 to 8.5, from 8.0 to 8.5, or about 8.5.

The heated post-reforming unit diesel reformate 84 is delivered into a desulfurization unit 140 disposed downstream of the heat exchanger 135, wherein the desulfurization unit removes sulfur compounds from the heated post-reforming unit diesel reformate 84.

In some embodiments, the sulfur content of the heated post-reforming unit diesel reformate 84 may be equal or less than 10 ppm. The sulfur content of the heated post-reforming unit diesel reformate 84 may be equal or less than 9 ppm, or 8 ppm, or 7 ppm, or 6 ppm. The sulfur content of the desulfurized product 94 may be from 5 ppm to 10 ppm, or from 6 ppm to 10 ppm, or from 7 ppm to 10 ppm, or from 8 ppm to 10 ppm, from 5 ppm to 9 ppm, or from 6 ppm to 9 ppm, or from 7 ppm to 9 ppm, or from 5 ppm to 8 ppm from 5 ppm to 7 ppm, or from 6 ppm to 8 ppm.

At which point, the desulfurized product 94, which is hydrogen rich, may be fed for use in an SOFC reactor or stack. The desulfurization unit 140 utilizes less severe operating conditions than the diesel autothermal reforming unit 120. In one embodiment, the desulfurization unit has an operating temperature at least 100° C. less than the operating temperature of the diesel autothermal reforming unit 120. In another embodiment, the operating temperature range of the desulfurization unit is from 300 to 500° C.

In some embodiments, the sulfur content of the desulfurized product 94 may be equal or less than 0.05 ppm. The sulfur content of the desulfurized product 94 may be equal or less than 0.04 ppm, or 0.03 ppm, or 0.02 ppm, or 0.01 ppm. The sulfur content of the desulfurized product 94 may be from 0.001 ppm to 0.05 ppm, or from 0.01 ppm to 0.05 ppm, or from 0.001 ppm to 0.03 ppm, or from 0.01 ppm to 0.03 ppm. Table 1 shows an example composition of the desulfurized product 94.

TABLE 1

| Components  | $H_2$ | $CO_2$ | CO    | $N_2$ | $CH_4$ | $H_2O$ | Sulfur content     |
|-------------|-------|--------|-------|-------|--------|--------|--------------------|
| Composition | 19.6% | 10.6%  | 6.33% | 39.0% | 0.22%  | 24.2%  | less than 0.01 ppm |

Turning now to more details on the system units depicted in FIG. 1, the diesel autothermal reforming unit 120 comprises a noble metal catalyst. Various catalysts suitable for performing the autothermal reforming reactions among the supplied fuel, water and air are contemplated herein. The noble metal catalyst may include Pt, Rh, Ru and a mixture thereof. The catalysts may be supported or unsupported. In supported catalyst embodiments, the catalyst support may comprise alumina, silica, ceria, or combinations thereof. While various amounts of noble metal catalyst are considered suitable, the amount of the noble metal catalyst may be controlled according to a kind of hydrocarbon-based fuel to be reformed, an amount of the supplied fuel and the like.

Various structural embodiments are contemplated for the diesel autothermal reforming unit 120. The internal and external partition walls of the diesel autothermal reforming unit may be formed of any material having high durability at a high temperature (about 800° C.) and an excellent heat transfer efficiency. For example, the internal and external partition walls can be substantially formed of stainless steel. In another embodiment, the diesel autothermal reforming unit comprises a porous support (including a support having through-pores along a fluid conveying direction) through which the fluid is passed and which impregnates the noble metal catalyst.

In one or more embodiments, the post-reforming unit 130 comprises a post-reforming catalyst formed of a transition metal, a noble metal, or a mixture thereof. In one or more embodiments, the transition metal of the post-reforming catalyst includes Ni, Mg and a mixture thereof, and the noble metal thereof includes Pt, Rh, Pd, Ru and a mixture thereof. Like the diesel autothermal reforming catalysts, the post-reforming catalysts may be supported or unsupported. In supported catalyst embodiments, the catalyst support may comprise alumina, silica, ceria, or combinations thereof.

Like the diesel autothermal reforming unit 120, the post-reforming unit 130 can be formed of a porous support (including a support having through-pores along a fluid conveying direction) through which the fluid is passed and which impregnates the post-reforming catalyst.

Like the diesel autothermal reforming unit 120, the desulfurizer 140 may be formed of a porous support (including a support having through-pores along a fluid conveying direction) through which the fluid is passed and which impregnates the desulfurizing catalyst. In one embodiment, the desulfurization unit 140 comprises a ZnO catalyst.

EXAMPLES

The following examples illustrate one or more additional features of the present disclosure. It should be understood that these examples are not intended to limit the scope of the disclosure or the appended claims in any manner.

Experimental simulations of embodiments similar to FIG. 1 were performed using the process simulator Aspen Plus™ from Aspen Technology, Inc. The following specific process features were used in the simulation: (1) Diesel fuel was modeled with 80 mol % n-dodecane and 20 mol % 1-methyl-naphthalene; (2) Fuel input was determined as reformate produces 1 kWe of electricity with operating voltage of Solid Oxide Fuel Cell (SOFC)=0.7 V, and fuel utilization=75%; (3) the diesel autothermal reforming unit and post reforming unit reach thermodynamic equilibriums; (4) Heat loss after diesel autothermal reforming is simulated with a cooler (20 W); and (5) the heat exchanger is counter-current type.

TABLE 2

| Example | Example 1 | Example 2 |
|---|---|---|
| Post-Reformer Outlet Temperature (° C.) | 702 | 741 |
| Heat Exchanger Steam Outlet Temperature (° C.) | 345 | 216 |
| Heat Exchanger Outlet/Desulfurizer Input Feed Temperature (° C.) | 138 | 302 |
| UA Value of Heat Exchanger (W/K) | 4.77 | 1.25 |

As shown in Table 2, the Example 1 system and heat exchanger operated sub-optimally. The UA value of the heat exchanger was 4.77 W/K and the desulfurization input feed temperature was 138° C. Conversely, the Example 2 system operated with a heat exchanger UA value of 1.25 W/K, which was almost ¼ of Example 1. This was achieved in part through an OCR of 0.73 and an SCR of 2.2, which helped result in a desulfurization input temperature of 302° C.

A first aspect of the present disclosure is directed to a diesel reformer system comprising a diesel autothermal reforming unit; a post-reforming unit disposed downstream of the autothermal reforming unit; a heat exchanger disposed downstream of the post-reforming unit; and a desulfurization unit disposed downstream of the heat exchanger.

A second aspect of the present disclosure may include the first aspect, wherein the diesel autothermal reforming unit comprises a noble metal catalyst.

A third aspect of the present disclosure may include either of the first or second aspects, wherein the diesel post-reforming unit comprises a noble metal catalyst, a transition metal catalyst, or combinations thereof.

A fourth aspect of the present disclosure may include any of the first through third aspects, wherein the desulfurization unit comprises a ZnO catalyst.

A fifth aspect of the present disclosure may include any of the first through fourth aspects, wherein the diesel autothermal reforming unit, the post-reforming unit, the heat exchanger, and the desulfurization unit are incorporated into a single reactor unit.

A sixth aspect of the present disclosure is directed to a method of diesel reforming comprising introducing one or more feed streams to a diesel autothermal reforming unit to at least partially convert the one or more feed streams to a diesel reformate, wherein the one or more feed streams comprising diesel fuel, air, and steam, and wherein the one or more feed streams comprise: a Steam to Carbon Ratio (SCR) greater than 1, wherein SCR=Steam feed/total Carbon in diesel fuel feed, and an Oxygen to Carbon Ratio (OCR) less than 1, wherein OCR=$O_2$ input from air feed/total Carbon in diesel fuel feed; introducing the diesel reformate to a post-reforming unit disposed downstream of the diesel autothermal reforming unit, wherein the post-reforming unit selectively decomposes low carbon ($C_2$-$C_5$) hydrocarbons in the diesel reformate into hydrogen and methane; and passing post-reforming unit diesel reformate through a heat exchanger disposed downstream of the post-reforming unit and into a desulfurization unit disposed downstream of the heat exchanger, wherein the desulfurization unit removes sulfur compounds from the post-reforming unit diesel reformate.

A seventh aspect of the present disclosure may include the sixth aspect, wherein the desulfurization unit has an operating temperature at least 100° C. less than the operating temperature of the diesel autothermal reforming unit.

An eighth aspect of the present disclosure may include either the sixth or seventh aspects, wherein the diesel reformate comprises syngas.

A ninth aspect of the present disclosure may include any of the sixth through eighth aspects, wherein the operating temperature range of the diesel autothermal reforming unit is from 750 to 850° C.

A tenth aspect of the present disclosure may include any of the sixth through ninth aspects, wherein the operating temperature range of the desulfurization unit is from 300 to 500° C.

An eleventh aspect of the present disclosure may include any of the sixth through tenth aspects, wherein the SCR is from 2 to 3.

A twelfth aspect of the present disclosure may include any of the sixth through eleventh aspects, wherein the OCR is from 0.6 to 0.8.

A thirteenth aspect of the present disclosure may include any of the sixth through twelfth aspects, wherein the diesel autothermal reforming unit comprises a noble metal catalyst.

A fourteenth aspect of the present disclosure may include any of the sixth through thirteenth aspects, wherein the diesel post-reforming unit comprises a noble metal catalyst, a transition metal catalyst, or combinations thereof.

A fifteenth aspect of the present disclosure may include any of the sixth through fourteenth aspects, wherein the desulfurization unit comprises a ZnO catalyst.

A sixteenth aspect of the present disclosure may include any of the sixth through fifteenth aspects, wherein the diesel autothermal reforming unit, the post-reforming unit, the heat exchanger, and the desulfurization unit are incorporated into a single reactor unit.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in one or more embodiments, a mixture of isomers of that constituent. It should be appreciated that the examples supply compositional ranges for various compositions, and that the total amount of isomers of a particular chemical composition can constitute a range.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

What is claimed is:

1. A method of diesel reforming comprising:
   introducing one or more feed streams to a diesel autothermal reforming unit to at least partially convert the one or more feed streams to a diesel reformate, wherein the one or more feed streams comprising diesel fuel, air, and steam, and wherein the one or more feed streams comprise:
   a Steam to Carbon Ratio (SCR) greater than 1, wherein SCR=Steam feed/total Carbon in diesel fuel feed, and
   an Oxygen to Carbon Ratio (OCR) less than 1, wherein OCR=$O_2$ input from air feed/total Carbon in diesel fuel feed;
   introducing the diesel reformate to a post-reforming unit disposed downstream of the diesel autothermal reforming unit, wherein the post-reforming unit selectively decomposes low carbon ($C_2$-$C_5$) hydrocarbons in the diesel reformate into hydrogen and methane; and
   passing post-reforming unit diesel reformate through a heat exchanger disposed downstream of the post-reforming unit and into a desulfurization unit disposed downstream of the heat exchanger, wherein the desulfurization unit removes sulfur compounds from the post-reforming unit diesel reformate.

2. The method of claim 1, wherein the desulfurization unit has an operating temperature at least 100° C. less than the operating temperature of the diesel autothermal reforming unit.

3. The method of claim 1, wherein the diesel reformate comprises syngas.

4. The method of claim 1, wherein the operating temperature range of the diesel autothermal reforming unit is from 750 to 850° C.

5. The method of claim 1, wherein the operating temperature range of the desulfurization unit is from 300 to 500° C.

6. The method of claim 1, wherein the SCR is from 2 to 3.

7. The method of claim 1, wherein the OCR is from 0.6 to 0.8.

8. The method of claim 1, wherein the diesel autothermal reforming unit comprises a noble metal catalyst.

9. The method of claim 1, wherein the diesel post-reforming unit comprises a noble metal catalyst, a transition metal catalyst, or combinations thereof.

10. The method of claim 1, wherein the desulfurization unit comprises a ZnO catalyst.

11. The method of claim 1, wherein the diesel autothermal reforming unit, the post-reforming unit, the heat exchanger, and the desulfurization unit are incorporated into a single reactor unit.

12. The method of claim 1, wherein heat transfer amount of the heat exchanger is from 0.75 watts per kelvin (W/K) to 4.0 W/K.

* * * * *